United States Patent [19]
Hoffbauer et al.

[11] 3,942,868
[45] Mar. 9, 1976

[54] CINE PROJECTION SCREEN

[75] Inventors: Hans Günther Hoffbauer; Karl Kaufmann, both of Bad Lippspringe, Germany

[73] Assignee: Mechanische Weberie GmbH., Germany

[22] Filed: Apr. 23, 1974

[21] Appl. No.: 463,407

[30] Foreign Application Priority Data
Apr. 27, 1973 Germany............................ 2321428

[52] U.S. Cl.................................. 350/117; 248/324
[51] Int. Cl.² ........................................... G03B 21/56
[58] Field of Search ....... 350/117; 248/324; 160/70, 160/79, 265, 328, 24

[56] References Cited
UNITED STATES PATENTS

| | | | |
|---|---|---|---|
| 1,732,489 | 10/1929 | Uckotter | 248/278 |
| 1,977,844 | 10/1934 | Blanchard | 160/265 |
| 2,793,687 | 5/1957 | Petrick | 160/328 X |
| 3,233,658 | 2/1966 | Riedel | 160/328 |
| 3,485,471 | 12/1969 | McCurdy | 248/278 X |
| 3,592,255 | 7/1971 | Potter et al. | 160/24 |
| 3,750,994 | 8/1973 | Bieschke | 248/324 |
| 3,750,995 | 8/1973 | Genger | 248/324 |

*Primary Examiner*—L. T. Hix
*Assistant Examiner*—E. M. O'Connor
*Attorney, Agent, or Firm*—Ostrolenk, Faber, Gerb & Soffen

[57] ABSTRACT

The specification describes a roll up cine projection screen comprising struts for holding it taut in the extended condition for use. It is adapted to be held on a rolling up rod or a tubular casing on a carrier and in the case of which the struts are adapted to pivot with the cine projection screen held taut by them about a horizontal axis. The screen can be secured in several angular positions by means of two pivot bearings having vertical and horizontal axis respectively.

8 Claims, 4 Drawing Figures

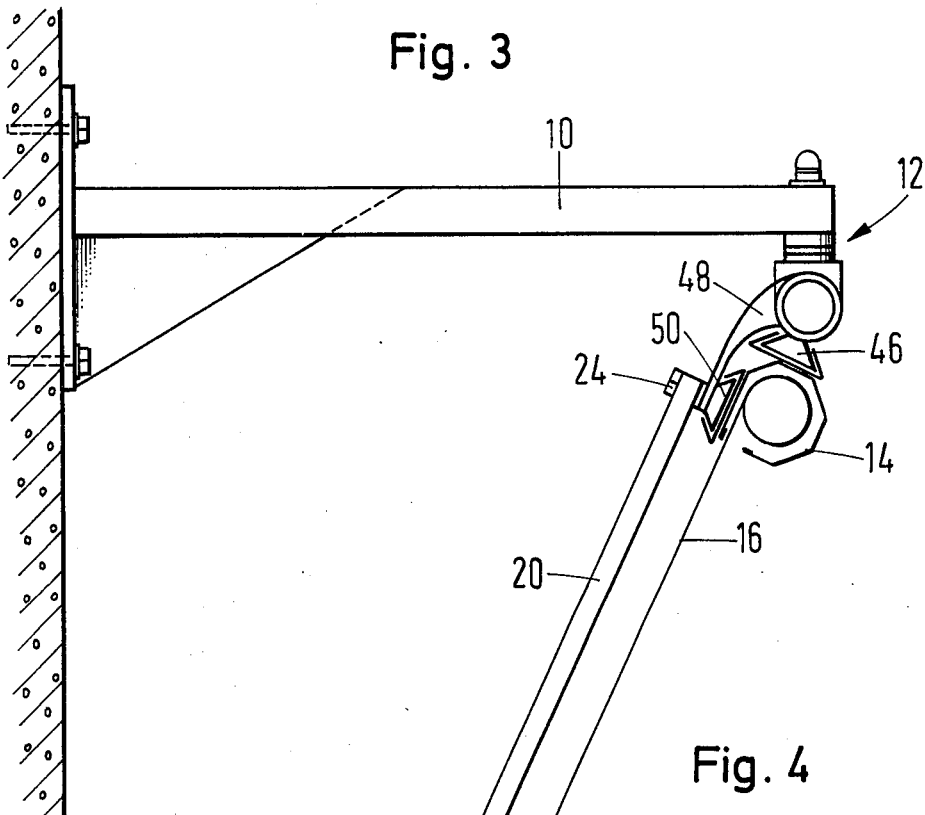
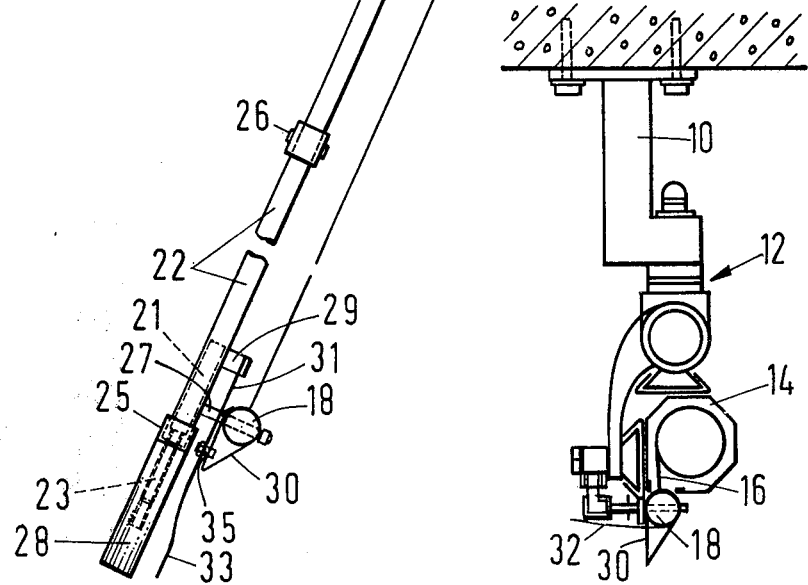

3,942,868

CINE PROJECTION SCREEN

BACKGROUND OF INVENTION

1. Field to which invention relates

The present invention relates to cine projection screen.

2. The prior art

A roll up cine projection screen has already been proposed which is adapted to be held taut in the extended condition for use by means of struts and is adapted to be hung by means of either of its roll up rod or its tubular casing on a carrier. Furthermore, the struts with the cine projection screen held taut on them are pivoted on the carrier about a horizontal axis parallel to the plane of the screen and are adapted to be locked in several angular positions.

With this arrangement it is possible, more particularly for the purposes of overhead projection, though also for other types of projection, to arrange for any desired oblique positioning of the plane of the screen with respect to the vertical plane and thus to produce such a setting with respect to the optic axis of the projector that distortion owing to converging lines are prevented. A condition for distortion-free projection is, however, also an alignment between the projector and the cine screen in the horizontal plane in such a manner that the optic axis of the projector passes perpendicularly through the screen plane in its diagonal point of intersection. Accordingly in the case of prior art cine screens the position of the projector in the room was fixed. It is, however, often necessary or desired to arrange the projector at another place in the room, for example in order to avoid furniture, so that the optic axis runs obliquely through the room towards the projection screen.

SUMMARY OF THE INVENTION

One aim of the present invention is to make possible the production of distortion-free pictures in the case of such lateral oblique projection.

The present invention consists in a roll up cine projection screen comprising struts for holding it taut in the extended condition for use and which screen is adapted to be held on a roll up means, namely a rod or a tubular casing which is in turn supported on a carrier. The struts are adapted to pivot, with the cine projection screen held taut by them, about a horizontal axis running parallel to the plane of the screen and can be locked in several angular positions. Between one pivot bearing that has a horizontal axis and the carrier is located another a pivot bearing with a vertical axis. Owing to this additional possibility of pivoting movement it becomes possible to turn the cine screen even in the extended condition towards the auditorium or to the viewers who are locate to the right and to the left. It is thus possible for example even in the case of the use of an opaque cloth to arrange the screen on the window side of a room without the light shining on it giving rise to a disturbing effect.

The pivot joint in accordance with the invention with a vertical axis provides for central hanging up means which can be used for attachment to the ceiling or to the wall and only requires very little space. In the case of the construction in accordance with the prior art two massive lateral rods had to be arranged on the wall or on the ceiling respectively. The carrier in accordance with the invention with the double pivot bearings is of small dimensions comparatively speaking when the tubular casing is removed and the carrier does not appear bulky.

In accordance with a preferred embodiment of the invention for a carrier, use is made of a tube, preferably of rectangular cross-section, which is provided with a vertical through hole and it is stretched as a wall arm or is constructed as a covering arm with an L-shape. The hole in the carrier has a threaded pin inserted in it so that the pin can rotate. The carrier is secured by being screwed into place by the threaded pin. The threaded pin carries a pivoting sleeve with a vertical axis, and in this sleeve a pivot pin runs which has attachment means for the screen.

By the use of suitable friction brakes in the vertical and horizontal axis bearings, fixation of the screen in any desired position becomes possible without it being necessary to slacken off and tighten up clamping screws.

In accordance with a further embodiment of the invention the cine screen is provided with a drawing out handle, which is arranged at the lower weighting tube at the bottom end portion of the screen and the handle is screwed, on a thread and can be tightened subsequently in the best possible fashion in order to hold the cine screen securely in all conditions. For this purpose the spring controlled winding and unwinding roller of the screen roll up means can be fixed against rotation by a screen motion run up brake so that it can no longer yield on subsequent tightening.

LIST OF SEVERAL VIEWS OF DRAWINGS

In what follows an embodiment of the invention will be described with reference to the accompanying drawings.

FIG. 3 is a side view of a cine projection screen suspended on a wall arm in the drawn out condition.

FIG. 4 shows a cine projection screen suspended on a ceiling arm in the rolled up condition.

DESCRIPTION OF PREFERRED EMBODIMENTS

Figure 1:
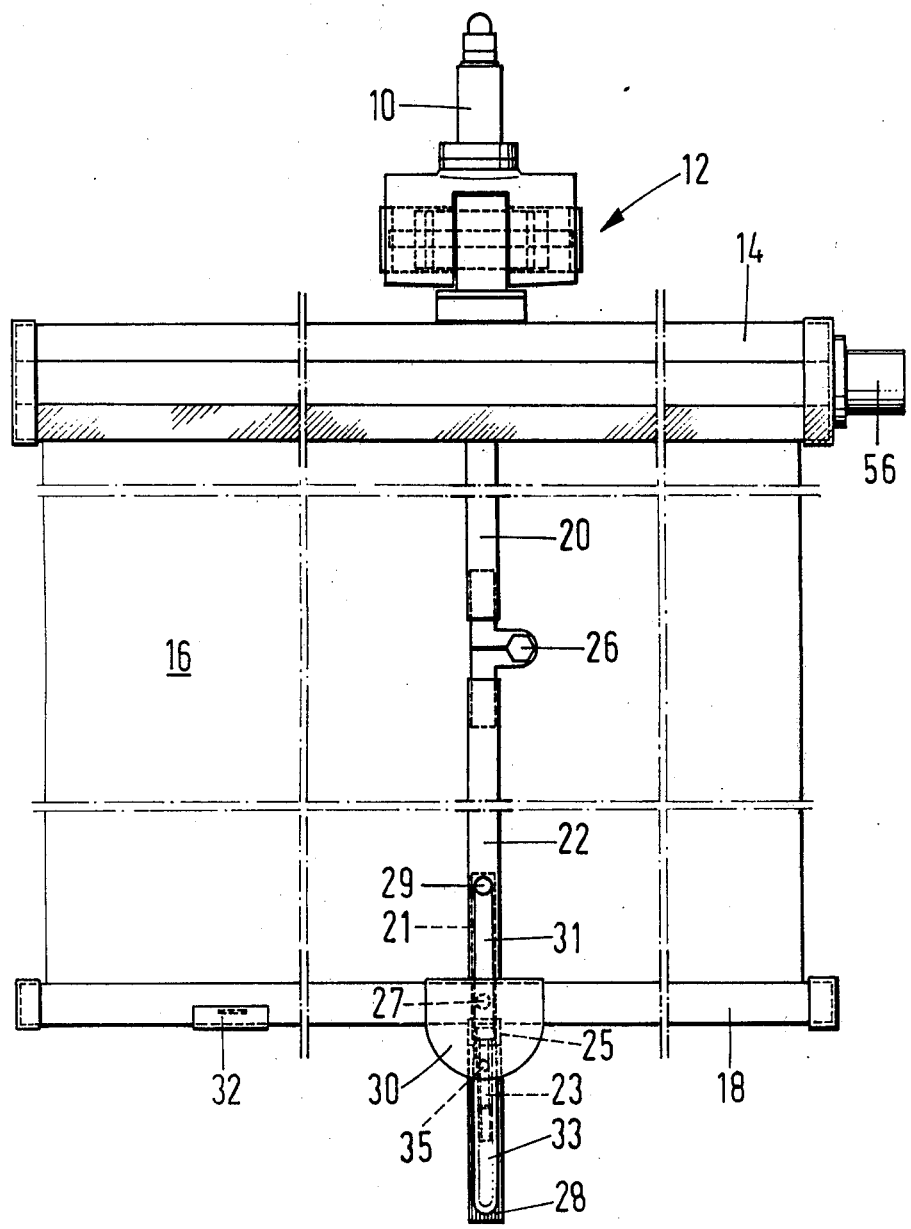
FIG. 1 shows a partly broken away view of the cine screen suspension means in accordance with the invention with the cine screen drawn out.
Figure 2:
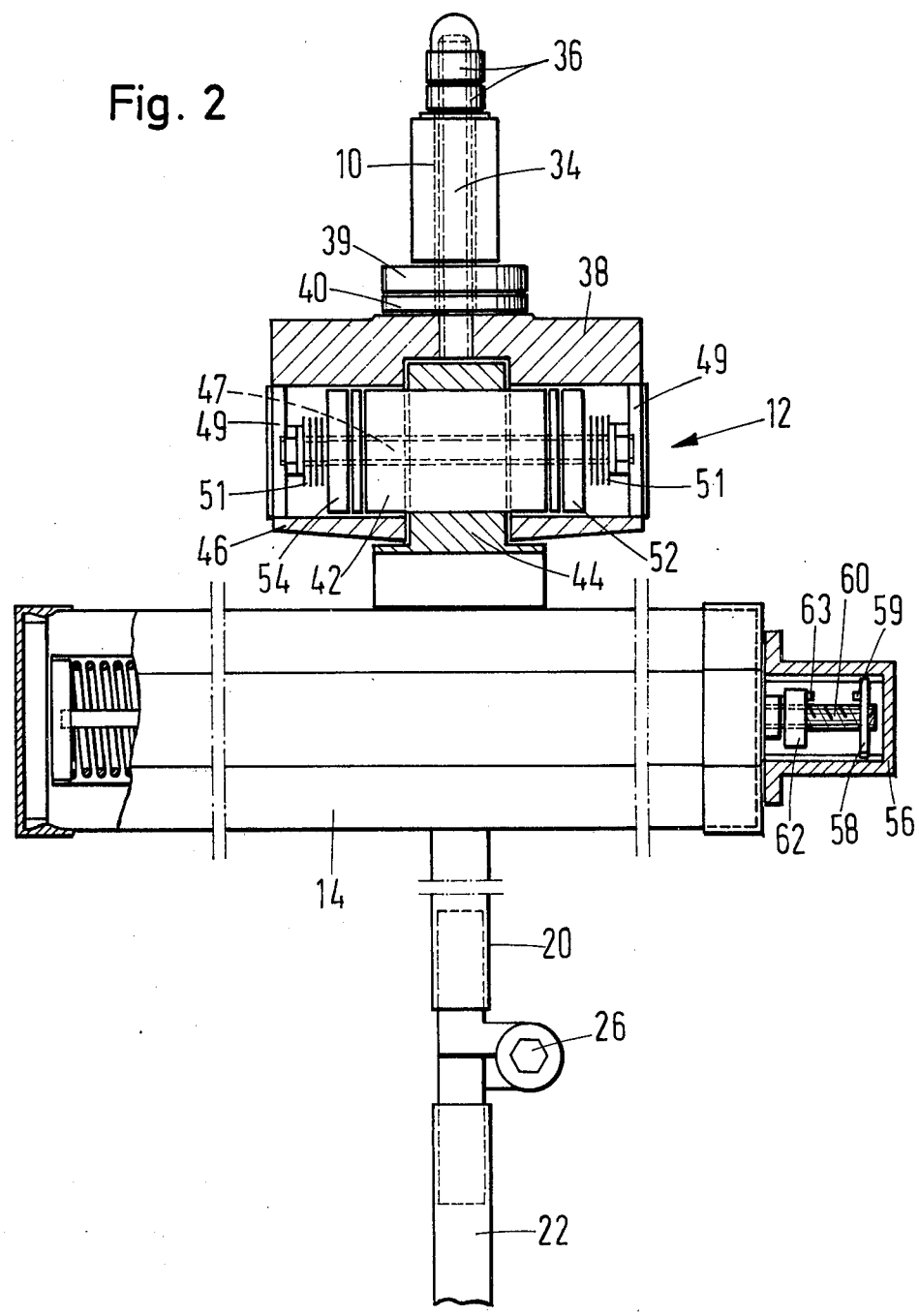
FIG. 2 shows on a larger scale a sectional view of the double joint arrangement of the suspending or carrying means.

As a carrier for the cine screen use is made of a single carrying arm or carrier 10, which in accordance with FIG. 3 is constructed for wall mounting as an extended arm and in accordance with FIG. 4 is constructed for attachment to the ceiling as an L-shaped arm. This carrying arm can for example be constructed as a rectangular tube and be provided with an end cap. By means of a joint arrangement 12, which will be described further below in conjunction with FIG. 2, the screen sleeve or tube or roll up means 14 is carried on the carrier 10. This tube 14 encloses the screen 16 when latter is in the wound up. In accordance with FIG. 1 the screen is drawn out of the tube or roll up means 14. The lower end of the screen 16 is mounted in a slotted tube 18. The drawn out screen is held taut by a spreading strut arrangement in the form of two arms 20 and 22.

The upper spreading or extending arm 20 is attached via a pivot joint 24 (see FIG. 3) in a pivoting manner on the double joint 12 and is connected with the lower spreading arm 22 via a knee joint 26. The spreading arms 20 and 22 consist of tubes of square cross-section. In the free end of the lower spreading or extending arm 22 a guide piece 21 can be slid axially, though it is suitably keyed by below described pin 27 to prevent guide piece 21 from turning. This guide piece 21 extends by means of a threaded pin 23 attached to it through the cap 25 that closes the free end of the arm 22. On the threaded pin 23 a tightening handle 28 with a female screw thread is screwed and this handle 28 rests axially on the tube end or on the cap 25 and serves for holding the screen taut, as will be described further below in detail.

The guide piece 21 carries a rectangularly projecting pin 27, which projects through a slot, extending along the lower spreading arm 22. Being able to pivot about its axis, pin 27 carries the slotted tube 18, which forms the weighting tube for the cine screen. The ability of pin 27 to pivot with respect to tube 18 permits arms 20 and 22 to fold as arm 22 pivots around pin 27.

Furthermore, on the guide piece 21 a projection 29 is attached, which also extends through the slot of the arm 22 and carries a spring plate 31 with a handle 33 that extends alongside handle 28. The spring plate 31 has a hole, through which the pin 27 projects. The spring plate 31 carries a detent pin 35, which fits into a detent hole of a detent plate 30, which plate is attached to the slotted tube 18. In the rolled up condition the slotted tube 18 closes the drawing out slot of the tube 14 and the joint 26 of the folded spreading or extending arms 20 and 22 is carried by a sheet metal joint holder 32, which is attached to the drawing out tube.

In order to ensure that the cine screen 16 can be drawn taut in the extended condition by means of the tightening handle 28, the rolling mechanism of the tube or roll up means 14 is provided with a screen unwinding brake. This consists of a disc 58 arranged in a nonrotary manner in the closing cap 56 and the disc 58 is guided by the thread of the roller threaded spindle 60 and can be axially moved by the latter. There is also a disc 62, which rotates with the roller threaded spindle 60, and which carries a run up pin 63. On drawing out the cine screen the roller threaded spindle 60 is turned and moves the nut 58 on the spindle 60 to the left until the pins 63 and 59, respectively, of the discs 62 and 58, respectively, engage each other firmly.

By gripping and pushing down the tightening handle 28 via the pivot pin 27 the slotted tube 22 is drawn out downwards and in the terminal position the pin 35 swings into the detent recess of the receiving plate 30. By turning the tightening handle the guide piece 21 within the tube 22 can be drawn downwards so that the slotted tube 18 connected with the guide piece 21 via the pivot pin 27 is also drawn downwards and tightens the cine screen, which in the upper tube is fixed by the screen unwinding brake.

The rolling up again of the cine screen is carried out in a simple manner by drawing on the spring handle 33 toward the tightening handle 28 so that the pin 35 comes out of its locked position and the spreading or extending joints 20, 22 can be folded and the cine screen with the slotted tube 18 is passed over the tightening handle 28.

The pivoting joint 12 has a vertical joint pin 34, which can be turned in a vertical hole of the carrying arm 10 and is supported by means of screwed on nuts 36 on the upper side of the carrying arm 10. The pivot pin 34 carries a bearing sleeve 38 with a horizontal axis. Between the carrying arm and the bearing sleeve an unstepped surface gripping plate 39 and an unstepped surface braking pad 40 are fitted so that when the nuts 36 are suitably tightened, frictional engagement is provided for which makes possible a swinging of the screen about the vertical axis but the screen is fixed in every pivoting position. The bearing sleeve 38 carries a pin 42, which in its center part carries a hub 44, on which a dovetail shaped carrying bearing 46 is attached while via an arm 48 a further dove tail-shaped carrying bearing 50 is attached for enabling pushing of elements 46, 48 along the tube 14. For passing through the arm 48 and the bearing 46 the sleeve 38 is slotted in the center part. The hub 44 is mounted in a non-rotary manner on the pin 42, which by means of the device described in what follows is guided with frictional engagement in the bearing sleeve 38. The pin 42 has a threaded bolt 47 passing through it, which is carried by closing caps 49, fixed in the bearing sleeve 38, at both ends and which is fixed in these caps by means of screws. Plate springs 51 placed on the threaded bolt 47 rest against the end caps and these springs act on the unstepped surface guiding discs 52 and press the discs against the unstepped surface braking discs 54, which come to engage the ends of the pin 42. In this manner the pin 42 is supported within the bearing sleeve 38 in a frictional manner and the friction is so adjusted by dimensioning of the springs 51 that the cine screen remains in the drawn out position at any desired angular setting.

We claim

1. A roll up cine projection screen, comprising:
    a screen; roll up means onto and off which said screen is wound; said screen having a first end portion away from said roll up means; said roll up means being axially rotatable for the winding and unwinding of said screen; first brake means associated with said roll up means for braking its unwinding rotation, thereby to enable tensioning of the unwound said screen;
    strut means connected at one end thereof to said in a manner such that said one end of said strut means does not shift along said screen with respect to said said strut means having screen connecting means at the other end thereof by which said strut means is connectable to said first end portion of said screen; said strut means being provided for supporting and stretching said screen;
    a carrier; a first vertical axis pivot bearing; a second horizontal axis pivot bearing; said first bearing joining said carrier and said second bearing for permitting relative horizontal pivoting between said carrier and said second bearing around a first vertical axis; said second bearing joining said first bearing and said roll up means for permitting relative vertical pivoting between said first bearing and said roll up means around a second horizontal axis; said second bearing comprises a horizontal bearing sleeve, a horizontal pin journalled in and rotatable with respect to said bearing sleeve; and said roll up means being secured to said horizontal pin; said first bearing comprising a vertically oriented pivot pin extending into and between said carrier and said second bearing sleeve;
    a hub attached to said horizontal pin, said hub projecting out of said second bearing sleeve and toward said roll up means; cooperating engagement means on said roll up means and on said hub for connecting them together; said cooperating engagement means of said hub and said roll up means comprise a dovetail connection for enabling said hub to be slid lengthwise along said roll up means to a position generally centrally located along said roll up means;

second and third friction brake means associated respectively with said first and said second bearings for enabling free adjustment of the aforesaid element joined by said bearings and for holding stationary any selected orientations of those aforesaid elements;

both said first and said second bearings and their respective said second and third brake means being uniformly unstepped to permit adoption of vertical and horizontal orientations of said screen without steps on the aforesaid bearings and brake means controlling these orientations.

2. A cine projection screen in accordance with claim 1, wherein said carrier is a horizontal arm which is affixable to a wall by means of a suitable carrying bracket.

3. A cine projection screen in accordance with claim 1, wherein said carrier is constructed in an L-shaped and is mountable on a ceiling.

4. A roll up cine projection screen, comprising:

a screen; roll up means onto and off which said screen is wound; said screen having a first end portion away from said roll up means; said roll up means being axially rotatable for the winding and unwinding of said screen; first brake means associated with said roll up means for braking its unwinding rotation, thereby to enable tensioning of the unwound said screen;

strut means connected at one end thereof to said roll up means in a manner such that said one end of said strut means does not shift along said screen with respect to said roll up means; said strut means having screen connecting means at the other end thereof by which said strut means is connectable to said first end portion of said screen; said strut means being provided for supporting and stretching said screen;

said strut means comprise first and second strut arms and a folding joint connecting said arms; said first arm being pivotally connected at a first pivot connection at said roll up means; said second arm being pivotally connected at a second pivot connection at said screen first end portion; both said arm pivot connections and said folding joint enabling said arms to fold together and to shift apart;

a carrier; a first vertical axis pivot bearing; a second horizontal axis pivot bearing; said first bearing joining said carrier and said second bearing for permitting relative horizontal pivoting between said carrier and said second bearing around a first vertical axis; said second bearing joining said first bearing and said roll up means for permitting relative vertical pivoting between said first bearing and said roll up means around a second horizontal axis;

second and third friction brake means associated respectively with said first and second bearings for enabling free adjustment of the aforesaid element joined by said bearings and for holding stationary any selected orientations of those aforesaid elements;

both said first and said second bearings and their respective said second and third brake means being uniformly unstepped to permit adoption of vertical and horizontal orientations of said screen without steps on the aforesaid bearings and brake means controlling these orientations;

adjacent to the end portion of said second arm near said second pivot connection there is a guide piece axially movable with respect to said second arm; rotation inhibiting means connected with said guide piece to prevent its relative axial rotation with respect to said second arm; from said guide piece projects a screw threaded pin, said threaded pin being oriented generally parallel to said second arm;

a tightening handle with an internal screw thread that mates with the screw thread of said pin; said tightening handle being tightened over said pin and abuttingly against said second arm; said second pivot connection to said second arm being a pivot connection to said guide piece;

whereby tightening of said handle draws out said guide piece and said second pivot connection and tightens said screen.

5. A cine projection screen in accordance with claim 4, wherein said guide piece is within said second arm and said second arm is hollow so as to receive said guide piece;

said second pivot connection of said guide piece comprising a pivot pin projecting outwardly from said guide piece; a slot through said second arm; said pivot pin projecting through said slot and engaging with said screen first end portion; said second arm slot being of an axial length to permit axial shifting of said guide piece and said pivot pin due to tightening of said handle; said guide piece rotation inhibiting means comprising the cooperation of said pivot pin and said second arm slot through which said pivot pin passes.

6. A cine projection screen in accordance with claim 4, further comprising screen end portion engagement means attached to said guide piece; said screen end portion engagement means comprising a projection from said guide piece, a spring plate secured to said projection and normally biased toward said screen first end portion, a detent pin on said spring plate and a detent pin receiving recess on said screen first end portion for receiving said detent pin, whereby tightening of said handle draws out said guide piece, its said projection, said spring plate and said screen first end portion and thereby tightens said screen.

7. A cine projection screen in accordance with claim 6, wherein said guide piece is within said second arm and said second arm is hollow so as to receive said guide piece;

said second pivot connection of said guide piece comprising a pivot pin projecting outwardly from said guide piece; a slot through said second arm; said pivot pin projecting through said slot and engaging with said screen first end portion; said guide piece projection also projecting through said second arm slot, said second arm slot being of an axial length to permit axial shifting of said guide piece and said pivot pin due to tightening of said handle; said guide piece rotation inhibiting means comprising the cooperation of said pivot pin and said second arm slot through which said pivot pin passes.

8. A cine projection screen in accordance with claim 6, wherein said spring plate has a release handle extending alongside said tightening handle; said rlease handle being operable to move said detent pin out of said detent recess.

* * * * *

UNITED STATES PATENT OFFICE
CERTIFICATE OF CORRECTION

Patent No. 3,942,868      Dated March 9, 1976

Inventor(s) Hans G. Hoffbauer and Karl Kaufmann

It is certified that error appears in the above-identified patent and that said Letters Patent are hereby corrected as shown below:

Cover Page, at [73]: Change the name of the assignee from "Mechanische Weberie GmbH." to: --Mechanische Weberei GmbH.--

Signed and Sealed this twenty-ninth Day of June 1976

[SEAL]

Attest:

RUTH C. MASON
*Attesting Officer*

C. MARSHALL DANN
*Commissioner of Patents and Trademarks*